(12) United States Patent
Kobayashi et al.

(10) Patent No.: US 8,072,643 B2
(45) Date of Patent: Dec. 6, 2011

(54) IMAGE PROCESSING APPARATUS

(75) Inventors: Akio Kobayashi, Kyoto (JP); Toru Asaeda, Nara (JP); Hidefumi Okada, Mie (JP); Mitsuaki Kurokawa, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1077 days.

(21) Appl. No.: 11/792,481

(22) PCT Filed: Sep. 26, 2005

(86) PCT No.: PCT/JP2005/018228
§ 371 (c)(1),
(2), (4) Date: Jun. 7, 2007

(87) PCT Pub. No.: WO2006/064604
PCT Pub. Date: Jun. 22, 2006

(65) Prior Publication Data
US 2008/0084581 A1 Apr. 10, 2008

(30) Foreign Application Priority Data
Dec. 17, 2004 (JP) .................................. 2004-365820

(51) Int. Cl.
G06F 15/00 (2006.01)
G06K 1/00 (2006.01)
G06K 15/00 (2006.01)
H04N 1/60 (2006.01)

(52) U.S. Cl. ........................................ 358/1.16; 358/1.9

(58) Field of Classification Search .................. 358/1.16, 358/1.15, 1.9, 1.13, 1.1
See application file for complete search history.

(56) References Cited

U.S. PATENT DOCUMENTS

| 5,841,418 A | | 11/1998 | Bril et al. ........................ 345/3 |
| 6,130,710 A | * | 10/2000 | Yasuda ..................... 348/220.1 |

FOREIGN PATENT DOCUMENTS

| CN | 1236169 | 11/1999 |
| CN | 1402355 | 3/2003 |
| CN | 1462544 | 12/2003 |
| JP | 9-319352 | 12/1997 |
| JP | 2002-247517 | 8/2002 |

OTHER PUBLICATIONS

Chinese Office Action dated Oct. 17, 2008 with English translation.

* cited by examiner

Primary Examiner — Douglas Tran
(74) Attorney, Agent, or Firm — Kratz, Quintos & Hanson, LLP

(57) ABSTRACT

An image processing apparatus (10) includes a bus (B1) and a bus (B2). A series of processes for creating YUV image data for HDTV is executed by means of a bus (B1) and an SDRAM (32). Furthermore, a series of processes for creating YUV image data for LCD monitor (66) is executed by means of a bus (B3) and an SDRAM (54). Here, the resolution of the YUV image data for HDTV is higher than that of the YUV image data for LCD monitor. That is, the bus (B1) and the SDRAM (32) are utilized for high-resolution moving image data processing, and the bus (B3) and the SDRAM 54 are utilized for low-resolution moving image data processing.

14 Claims, 5 Drawing Sheets

FIG. 8
(A) HDTV MOVING IMAGE
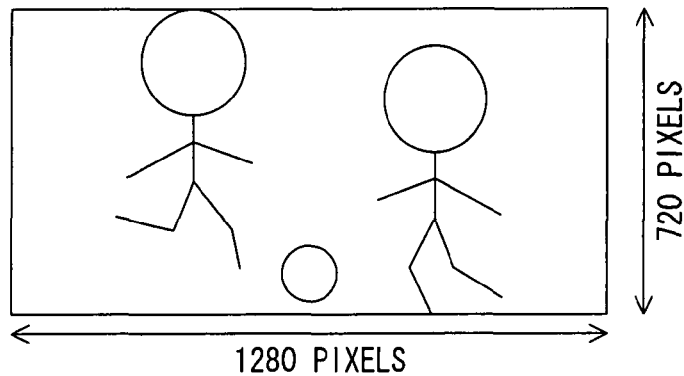
(B) NTSC MOVING IMAGE
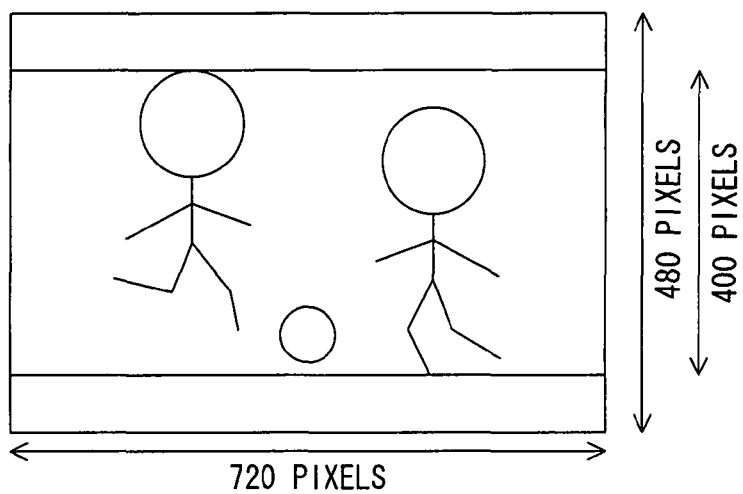
(C) RECORD STILL IMAGE
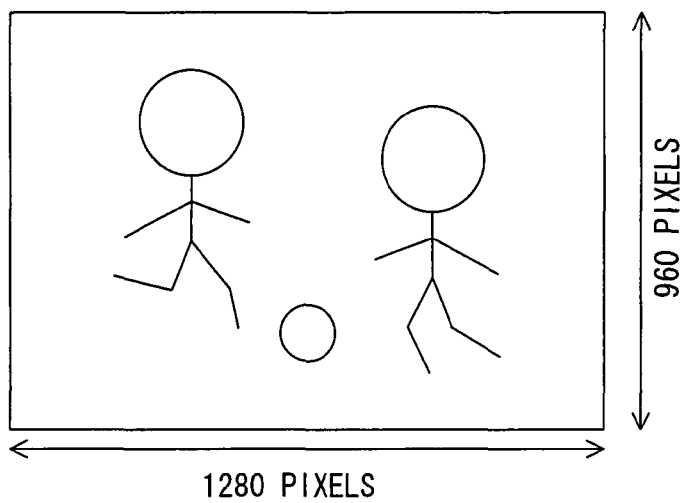

IMAGE PROCESSING APPARATUS

TECHNICAL FIELD

The present invention relates to an image processing apparatus. More specifically, the present invention relates to an image processing apparatus which is applied to a video camera, and displays a moving image of an object scene on a monitor.

PRIOR ART

One example of such a kind of conventional apparatus is disclosed in Patent Document 1 (Japanese Patent Application Laid-Open No. 2002-247517). According to the prior art, a composite image signal is created on the basis of moving image data of an imaged object, and the created composite image signal is output to a monitor. Consequently, a real-time motion image of the object scene is displayed on the monitor screen.

However, in the prior art, a monitor for displaying an image is one. Thus, in the prior art, creating a composite image signal corresponding to only one format is assumed. That is, the prior art does not disclose processing corresponding to a plurality of formats, such as an HDTV image and an NTSC image.

SUMMARY OF THE INVENTION

Therefore, it is a primary object of the present invention to provide a novel image processing apparatus.

Another object of the present invention is to provide an image processing apparatus capable of executing processing conforming to a plurality of formats without a failure.

An image processing apparatus according to claim 1 comprises: a fetching means for fetching first moving image data to be written to a first memory through a first bus; a first processing means for performing first processing on the first moving image data read from the first memory through the first bus to generate second moving image data to be written to the first memory through the first bus; a first output means for performing output processing directed to a first monitor on second moving image data read from the first memory through the first bus; a reducing means for reducing a resolution of the second moving image data read from the first memory through the first bus to generate third moving image data to be written to a second memory through a second bus; and a second output means for performing output processing directed to a second monitor on the third moving image data read from the second memory through the second bus.

First moving image data is fetched by a fetching means, and written to a first memory through a first bus. The first moving image data stored in the first memory is read through the first bus, and is subjected to first processing by a first processing means. Second moving image data created by the first processing is written to the first memory through the first bus. The second moving image data stored in the first memory is read through the first bus, and subjected to output processing directed to a first monitor by a first output means. Consequently, a corresponding moving image is displayed on the screen of the first monitor.

A reducing means reduces the resolution of the second moving image data read from the first memory through the first bus. Third moving image data thus created is written to a second memory through a second bus. The third moving image data stored in the second memory is read through the second bus, and is subjected to output processing directed to a second monitor by a second output means. Consequently, a corresponding moving image is displayed on the screen of the second monitor.

Thus, a series of processes for creating the second moving image data output so as to be directed to the first monitor is executed by the first bus and the first memory. Furthermore, a series of processes for creating the third moving image data directed to the second monitor is executed by the second bus and the second memory. Here, the resolution of the second moving image data is higher than the resolution of the third moving image data. That is, for high speed processing like processing for high-resolution moving image data, the first bus and the first memory are utilized, and a low speed processing for low-resolution moving image data processing, the second bus and the second memory are utilized. Consequently, it is possible to execute processing conforming to a plurality of formats without failure.

An image processing apparatus according to claim 2 is dependent on claim 1, and the first moving image data is data including pixels each of which is assigned any one of a plurality of colors, and the first processing includes color processing for assigning all the plurality of colors to each of the pixels. By temporarily storing the first moving image data in the first memory, it is possible to ensure flexibility of fetching the first moving image data.

An image processing apparatus according to claim 3 is dependent on claim 1, and the second moving image data has a first resolution corresponding to a first aspect ratio, and the third moving image data has a second resolution corresponding to a second aspect ratio.

An image processing apparatus according to claim 4 is dependent on claim 3, and the first aspect ratio is 16:9, and the second aspect ratio is 4:3. In this case, the moving image based on the second moving image data can be displayed on the HDTV (High Definition TV), and the moving image based on the third moving image data can be displayed on the TV in the NTSC system, the PAL system, or the SECAM system.

An image processing apparatus according to claim 5 is dependent on claim 1, and the second moving image data and the third moving image data has the same frame rate with each other. This makes it possible to display moving images equal in smoothness to each other on the respective first monitor and the second monitor.

An image processing apparatus according to claim 6 is dependent on claim 1, and the fetching means includes an imaging means for periodically imaging an object scene. Thus, it is possible to realize a video camera capable of creating moving image data conforming to a plurality of formats.

An image processing apparatus according to claim 7 is dependent on claim 6, and the imaging means has an imaging surface formed with a plurality of partial imaging areas and a plurality of output channels respectively assigned to the plurality of partial imaging areas, and the fetching means further includes a creating means for creating the first moving image data on the basis of electric charges output from the plurality of output channels. Thus, it is possible to obtain the first moving image data improved in resolution and frame rate.

An image processing apparatus according to claim 8 is dependent on claim 1, and further comprises a first compressing means for compressing a data amount of the second moving image data read from the first memory through the first bus to generate fourth moving image data to be written to the first memory through the first bus. By transmitting the second moving image data before compression and the fourth moving image data after compression by means of the common bus, high-speed compression processing can be realized.

An image processing apparatus according to claim 9 is dependent on claim 8, and the first compressing means executes the compression processing when a first predetermined operation is performed.

An image processing apparatus according to claim 10 is dependent on claim 8, and further comprises a first writing means for writing the fourth moving image data read from the first memory through the first bus to the second memory through the second bus; and a moving image recording means for recording the fourth moving image data read from the second memory to a recording medium through the second bus in a recording medium.

An image processing apparatus according to claim 11 is dependent on claim 1, and further comprises a second processing means for performing second processing on one frame of first still image data forming the first moving image data to generate second still image data to be written to the second memory through the second bus. The first still image data is extracted from the first moving image data transferred through the first bus, and converted into the second still image data by the second processing. The converted second still image data is written to the second memory through the second bus. By utilizing the second bus and the second memory for the still image data processing (low speed processing) being free from a problem of the frame rate, it is possible to avoid failure of the processing.

An image processing apparatus according to claim 12 is dependent on claim 11, and the second processing means executes the second processing when a second predetermined operation is performed.

An image processing apparatus according to claim 13 is dependent on claim 11, and further comprises a second compressing means for compressing a data amount of the second still image data read from the second memory through the second bus to generate third still image data to be written to the second memory through the second bus. By transferring both of the second still image data before compression and the third still image data after compression by means of the common second bus, it is possible to realize high-speed compression processing.

An image processing apparatus according to claim 14 is dependent on claim 13, and further comprises a still image recording means for recording the third still image data created by the second compressing means in a recording medium.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 (A) is an illustrative view showing an aspect ratio of a moving image displayed on an HDTV;

FIG. 8 (B) is an illustrative view showing an aspect ratio of a moving image displayed on the LCD monitor; and FIG. 8 (C) is an illustrative view showing an aspect ratio of a recorded still image.

BEST MODE FOR PRACTICING THE INVENTION

Figure 1:
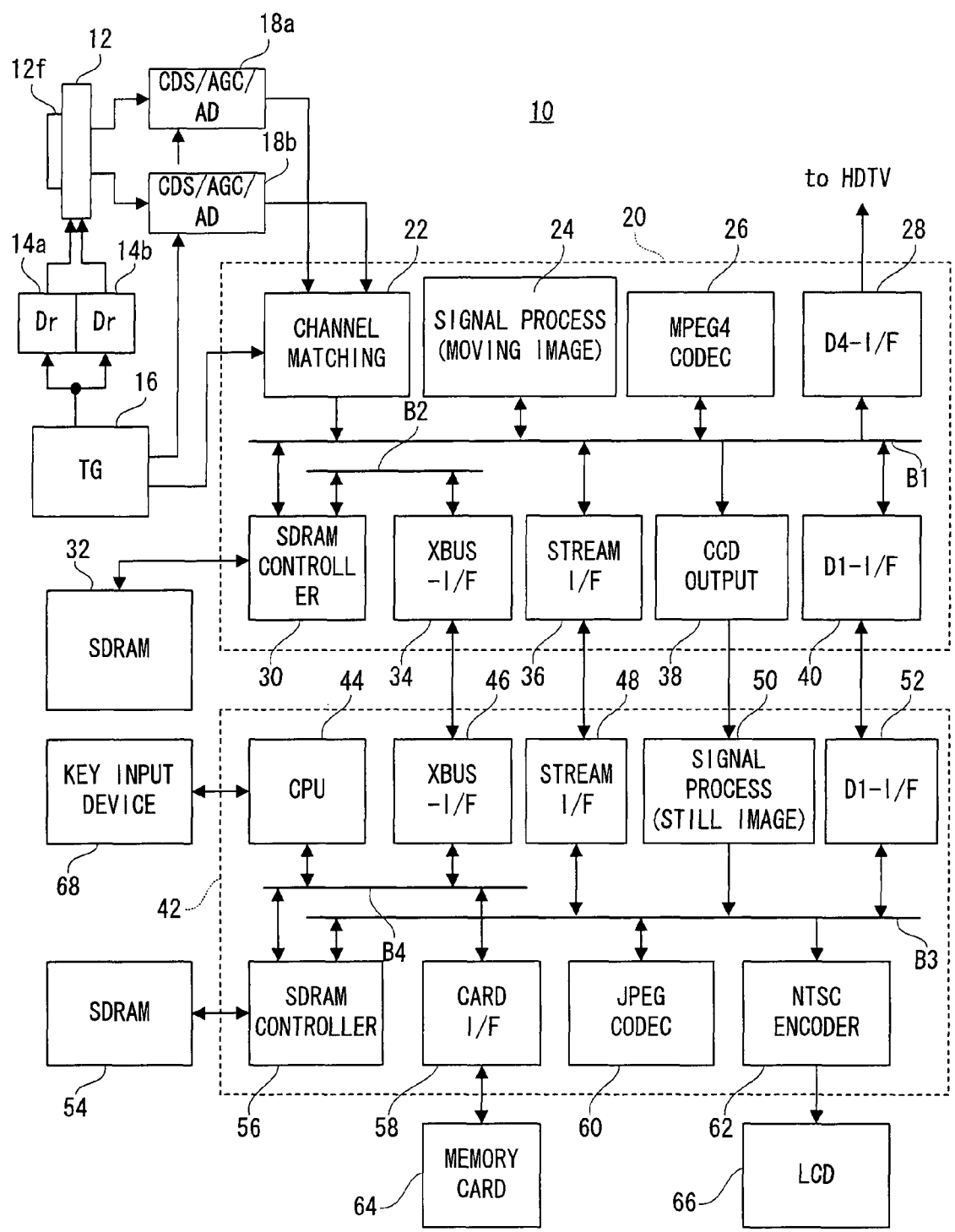
FIG. 1 is a block diagram showing a configuration of one embodiment of this invention.

Referring to FIG. 1, a digital video camera 10 of this embodiment includes a CCD imager 12. An optical image of an object scene is irradiated onto an imaging surface of the CCD imager 12 via an optical lens (not illustrated). The imaging surface is covered with a color filter 12f of a primary color Bayer array. Thus, electric charges created in each of a plurality of photoreceptors formed on the imaging surface have color information of R (Red), G (Green) or B (Blue).

When a camera mode is selected by a key input device 68, a TG (Timing Generator) 16 is activated by a CPU 44. The TG 16 generates a plurality of timing signals including a horizontal synchronization signal Hsync and a vertical synchronization signal Vsync. Each of drivers 14a and 14b drives the CCD imager 12 in response to such a timing signal. Thus, electric charges corresponding to one frame, that is, a raw image signal are output from the CCD imager 12. A vertical synchronization signal Vsync is created per 1/30 seconds, and a raw image signal output from the CCD imager 12 has a frame rate of 30 fps.

Figure 2:
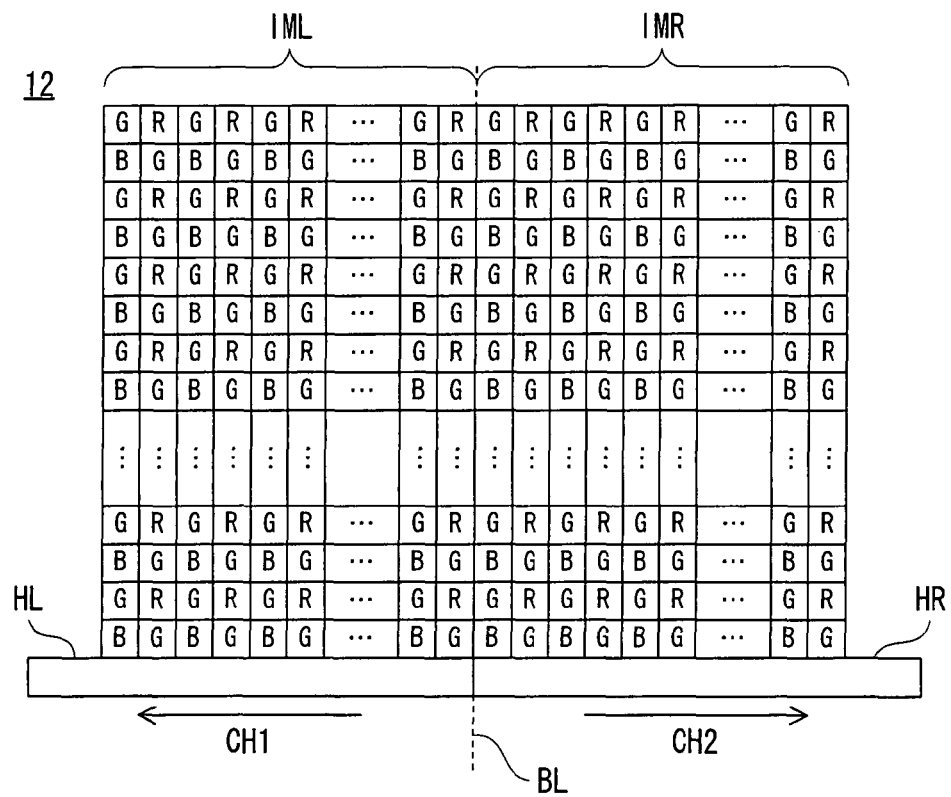
FIG. 2 is an illustrative view showing one example of a configuration of a CCD imager applied to FIG. 1 embodiment.
Figure 3:
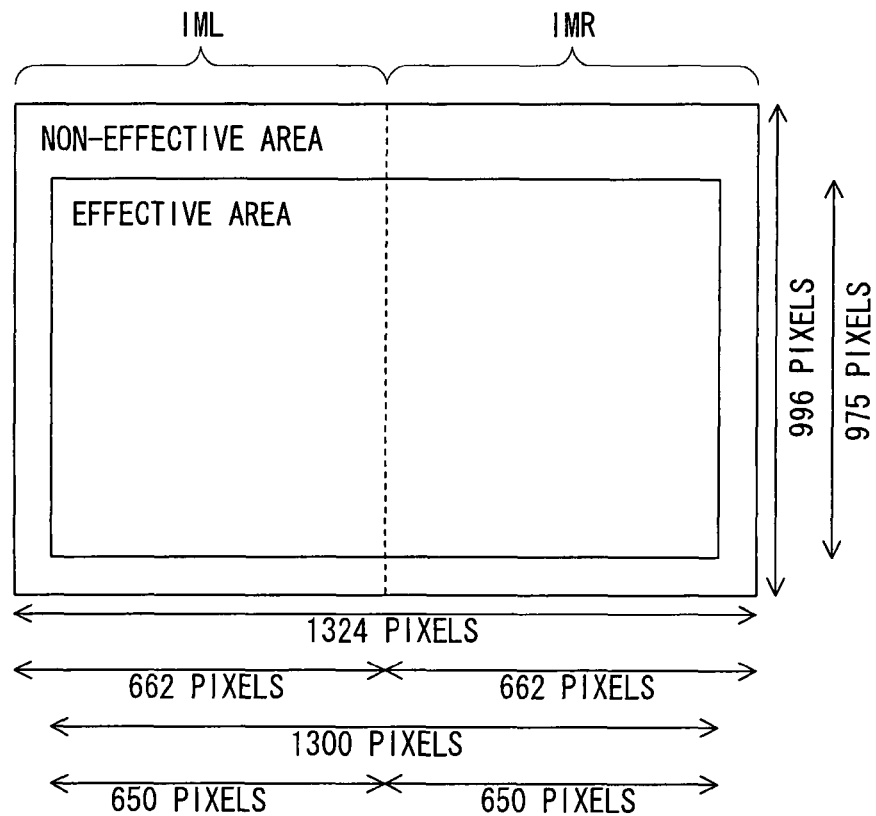
FIG. 3 is an illustrative view showing one example of a configuration of an imaging surface of the CCD imager shown in FIG. 2.

With reference to FIG. 2, the imaging surface of the CCD imager 12 has partial imaging areas IML and IMR. The partial imaging area IML is formed at the left of a boundary line BL vertically extending from the center of the imaging surface, and the partial imaging area IMR is formed at the right of the same boundary line BL. As understood from FIG. 3, the imaging surface has a horizontal resolution of 1324 pixels×a vertical resolution of 996 pixels. Furthermore, each of the partial imaging areas IML and IMR has a horizontal resolution of 662 pixels× a vertical resolution of 996 pixels. Thus, the partial imaging areas IML and IMR are adjacent to each other via the boundary line.

It should be noted that an effective area on which an optical image is irradiated is an area of a horizontal resolution of 1300 pixels× a vertical resolution of 975 pixels assigned to an approximately center of the imaging surface.

Each of the partial imaging areas IML and IMR is assigned a plurality of vertical transfer registers not shown. Also, the partial imaging area IML is assigned a horizontal transfer register HL, and the imaging area IMR is assigned a horizontal transfer register HR. Thus, the electric charges created in the plurality of photoreceptors on the partial imaging area IML are output from a channel CH1 via the vertical transfer registers not shown and the horizontal transfer register HL. The electric charges created in the plurality of photoreceptors on the imaging area IMR are similarly output from a channel CH2 via the vertical transfer registers not shown and the horizontal transfer register HR.

That is, the driver 14*a* performs raster scanning (interlace scanning) on the partial imaging area IML on the basis of timing signals from the TG 16, and outputs raw image signals of the left half of the frame from the channel CH1. The driver 14*b* also performs raster scanning (interlace scanning) on the imaging area. IMR on the basis of timing signals from the TG 16, and outputs raw image signals of the right half of the frame from the channel CH2.

It should be noted that the transfer direction of the horizontal transfer register HR is opposite to the transfer direction of the horizontal transfer register HL. Thus, the raster scanning direction is also reversed between the partial imaging areas IML and IMR.

Returning to FIG. 1, a CDS/AGC/AD circuit 18*a* performs a series of processes, such as a correlative double sampling, an automatic gain adjustment, and an A/D conversion on a raw image signal from the channel CH1 in response to a timing signal from the TG 16. The CDS/AGC/AD circuit 18*b* also performs a series of processes such as a correlative double sampling, an automatic gain adjustment, and an A/D conversion on a raw image signal from the channel CH2 in response to a timing signal from the TG 16. The timing signal has a frequency of 27 MHz. Then, raw image data being a digital signal is output from each of the CDS/AGC/AD converters 18*a* and 18*b* at a clock rate of 27 MHz.

A channel matching circuit 22 provided in an ASIC 20 performs a series of matching processes such as a clip, a clamp, a white balance adjustment, etc. on the raw image data applied from the A/D converters 18*a* and 18*b*. The raw image data belonging to the effective area is extracted from the clipping process. The level difference between the channels is canceled by the clamping process. The difference of the white balance is canceled by the white balance adjustment processing. This matching processing is executed in response to a timing signal output from the TG 16. The channel matching circuit 22 issues a writing request to an SDRAM controller 30 every time that a predetermined amount of the matching processing is ended.

Figure 6:
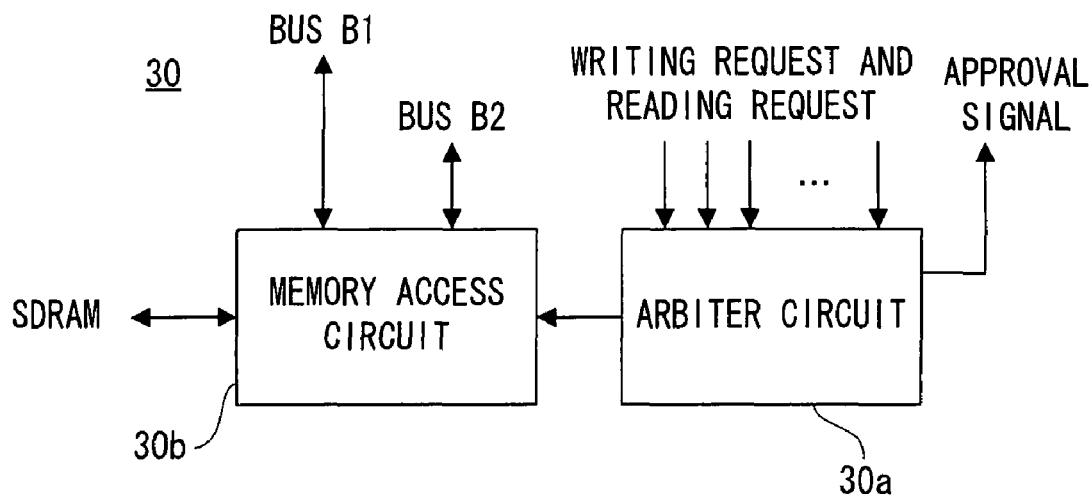
FIG. 6 is a block diagram showing one example of a configuration of an SDRAM controller applied to FIG. 1 embodiment.

The SDRAM controller 30 is constructed as shown in FIG. 6. The request issued by the channel matching circuit 22 is applied to an arbiter circuit 30*a*. The arbiter circuit 30*a* receives a request from a signal processing circuit 24, an MPEG codec 26, a D4-I/F 28, an XBUS-I/F 34, a stream I/F 36, a CCD output circuit 38, a D1-I/F 40 and a CPU 44 other than the channel matching circuit 22, and approves any one of the requests according to a priority set in advance. The arbiter circuit 30*a* applies an approval signal to a source of issuance of the approved request, and instructs a memory access circuit 30*b* to perform a process according to the approved request.

If the approved request is a writing request, the memory access circuit 30*b* writes a predetermined amount of data transferred through the bus B1 or B2 from the source of the issuance of the writing request into an SDRAM 32. Furthermore, if the approved request is a reading request, the memory access circuit 30*b* reads a predetermined amount of data according to the reading request from the SDRAM 32, and transfers the read data to the source of the issuance of the reading request through the bus B1 or B2.

Thus, the data transfer throng the bus B1 or B2 is intermittently executed in a time division manner. This makes it possible to prevent the data from being collide with each other.

Figure 4:
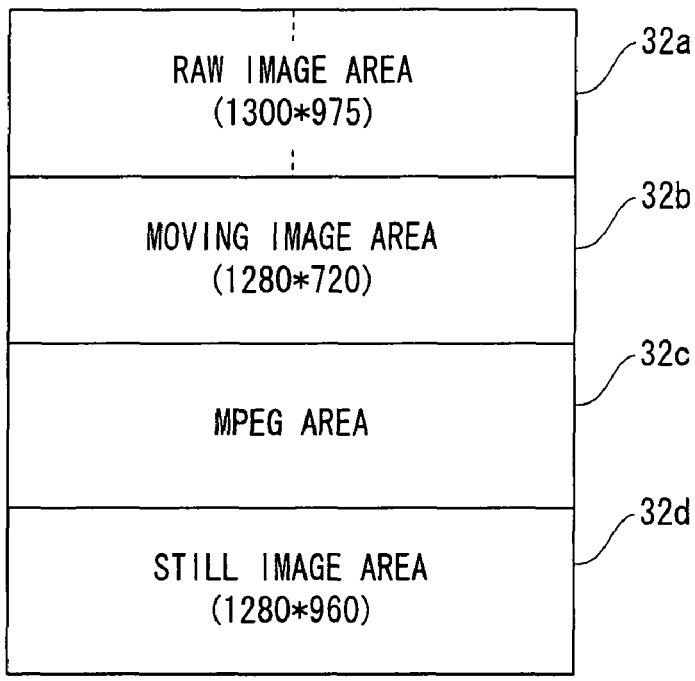
FIG. 4 is an illustrative view showing one example of a mapping state of an SDRAM applied to FIG. 1 embodiment.

Returning to FIG. 1, the channel matching circuit 22 transmits a predetermined amount of the raw image data on which the matching processing has been performed to the SDRAM controller 30 through the bus B1. The raw image data applied from the channel matching circuit 22 is written to a raw image area 32*a* (see FIG. 4) by the SDRAM controller 30. The raw image data of the channel CH1 is written to the left of the raw image area 32*a*, and the raw image data of the channel CH2 is written to the right of the raw image area 32*a*. Thus, the raw image data of a horizontal resolution of 1300 pixels× a vertical resolution of 975 pixels indicative of one frame of the object scene image is retained in the raw image area 32*a*.

The signal processing circuit 24 repeatedly issues a reading request to the SDRAM controller 30 to read the raw image data stored in the raw image area 32*a* by a predetermined amount. The raw image data read by the SDRAM controller 30 is applied to the signal processing circuit 24 through the bus B1. The signal processing circuit 24 performs processes, such as color separation, a YUV conversion, etc. on the raw image data thus transferred. The series of processes is executed at a clock rate of 54 MHz.

By repeating such processes, YUV image data having a horizontal resolution of 1280 pixels× a vertical resolution of 780 pixels is created at a ratio of one frame per 1/30 seconds. The YUV image data thus created is transferred to the SDRAM controller 30 through the bus B1 by a predetermined amount. In this case also, a writing request is repeatedly issued, and the YUV image data is written to a moving image area 32*b* (see FIG. 4) by the SDRAM controller 30.

The resolution of the raw image data is a horizontal resolution of 1300 pixels× a vertical resolution of 975 pixels, and therefore, the aspect ratio of the image based on the raw image data is 4:3. On the contrary thereto, the resolution of the YUV image data created by the signal processing circuit 24 is a horizontal resolution 1280 pixels× a vertical resolution of 780 pixels, and therefore, the aspect ratio of the image based on the YUV image data is 16:9. Thus, when YUV image data is created, raw image data at the both vertical ends is partially removed.

The D1-I/F 40 repeatedly issues a reading request to the SDRAM controller 30, and reads by a predetermined amount the YUV image data stored in the moving image area 32*b*. The YUV image data is read from the moving image area 32*b* in a raster scanning manner (interlace scanning manner), and applied to the D1-I/F 40 via the bus B1. At this time, the YUV image data is input to the D1-I/F 40 at a rate of one frame per 1/30 seconds.

The D1-I/F 40 performs format converting processing on the applied YUV image data. The processing is executed according to a clock rate of 27 MHz, and the processed YUV image data has a horizontal resolution 720 pixels× a vertical resolution of 480 pixels, and has an aspect ratio of 4:3. Thus, the YUV image data compliant with the D1 standard is created at a rate one frame per 1/30 seconds.

Additionally, the aspect ratio of the YUV image data applied to the D1-I/F 40 is 16:9, and the aspect ratio of the YUV image data output from the D1-I/F 40 is 4:3. Thus, a letter box component is assigned to the both vertical ends of the YUV image data output from the D1-I/F 40.

The YUV image data created in the D1-I/F 40 is output to a D1-I/F 52 provided in an ASIC 42. The D1-I/F 52 also fetches the YUV image data at a clock rate of 27 MHz. The D1-I/F 52 issues a writing request to an SDRAM controller 56 every time that a predetermined amount of the YUV image data is fetched, and when the request is approved, a predetermined amount of the YUV image data is transmitted to the SDRAM controller 56 through a bus B3.

Figure 7:
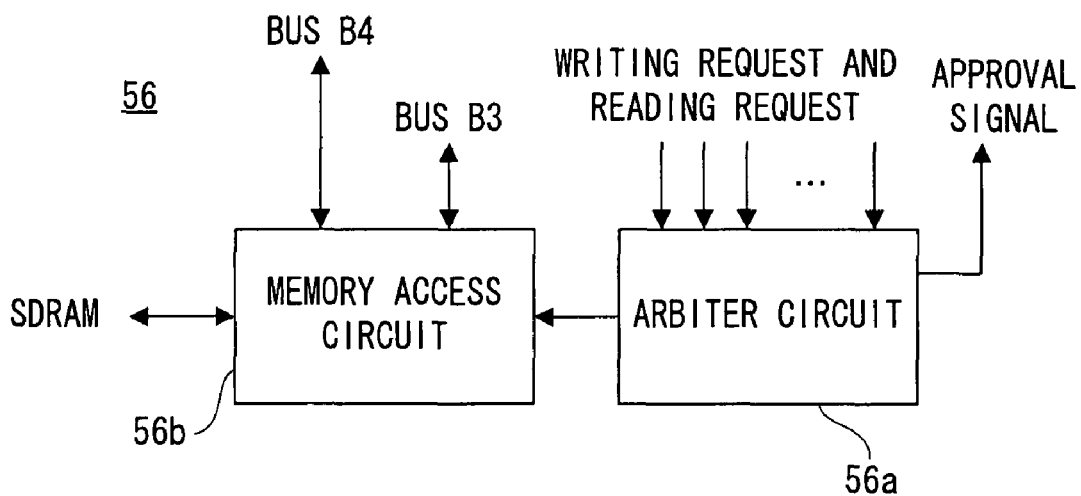
FIG. 7 is a block diagram showing one example of a configuration of another SDRAM controller applied to FIG. 1 embodiment.

Referring to FIG. 7, the SDRAM controller 56 is formed by an arbiter circuit 56*a* and a memory access circuit 56*b* similar to an SDRAM controller 39 shown in FIG. 6. In addition, each of the arbiter circuit 56*a* and the memory access circuit 56*b* operates much the way the arbiter circuit 30a and the memory access circuit 30b shown in FIG. 6 do. Thus, a duplicated description is omitted.

Figure 5:
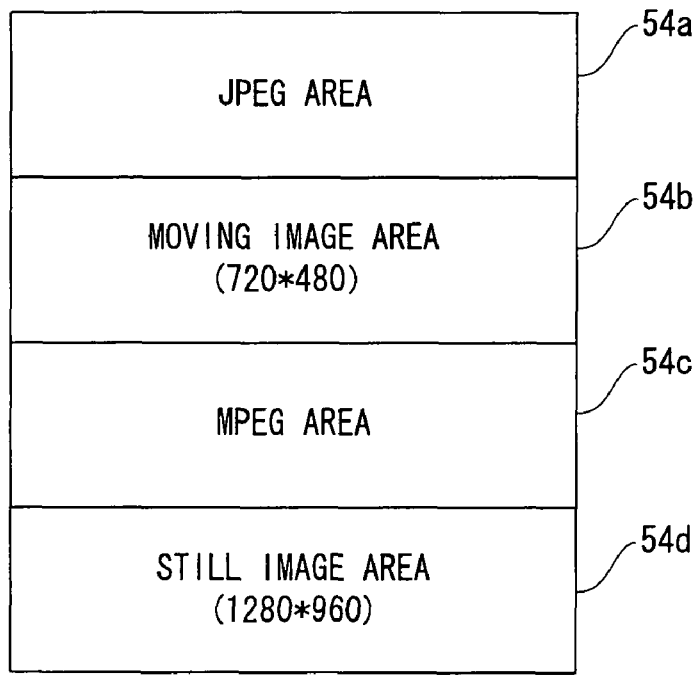
FIG. 5 is an illustrative view showing one example of a mapping state of another SDRAM applied to FIG. 1 embodiment.

Returning to FIG. 1, the SDRAM controller 56 writes the predetermined amount of the YUV image data transferred from the D1-I/F 52 to a moving image area 54b (see FIG. 5). The YUV image data is written to the moving image area 54b at a rate of one frame per 1/30 seconds.

An NTSC encoder 62 repeatedly issues a reading request to the SDRAM controller 56 in order to read the YUV image data stored in the moving image area 54b by a predetermined amount. The YUV image data is read by the SDRAM controller 56, and applied to the NTSC encoder 62 through the bus B3.

The NTSC encoder 62 converts the applied YUV image data into a composite video signal in the NTSC system. The composite video signal is also created at a rate of one frame per 1/30 seconds, and the created composite video signal is output to an LCD monitor 66. Consequently, a real-time motion image (through-image) of the object scene is displayed on the monitor screen in a manner shown in FIG. 8 (B).

When the D4-I/F 28 is connected to an HDTV not shown, the CPU 44 activates the D4-I/F 28 in place of the D1-I/F 40 or along with the D1-I/F 40. The D4-I/F 28 reads the YUV image data stored in the moving image area 32b through the bus B1 and the SDRAM controller 30 by a predetermined amount. The YUV image data is read at a frame rate of 30 fps in a raster scanning manner (progressive scanning manner). The D4-I/F 28 converts the read YUV image data into a video signal being compliant with the D4 standard, and outputs the converted video signal to the HDTV. Consequently, a through-image of high image quality is displayed on the TV screen as shown in FIG. 8 (A).

When a moving image recording start operation is executed by a key input device 68, an MPEG 4 codec 26 and the stream I/F 36 are activated by the CPU 44. The MPEG 4 codec 26 reads the YUV image data stored in the moving image area 32b (see FIG. 4) of the SDRAM 32 by a predetermined amount in the above described manner. That is, a reading request is repeatedly issued to the SDRAM controller 30, and the YUV image data is fetched by a predetermined amount through the bus B1. The fetched YUV image data is compressed according to the MPEG 4 system. Such reading processing and compression processing are executed at a rate of one frame per 1/30 seconds.

An MPEG 4 stream created by the compression processing is applied to the SDRAM controller 30 by a predetermined amount through the bus B1 as described above, and written to an MPEG area 32c (see FIG. 4) of the SDRAM 32.

The stream I/F 36 reads the MPEG 4 stream stored in the MPEG area 32c by a predetermined amount through the bus B1 and the SDRAM controller 30, and outputs the read MPEG 4 stream to a stream I/F 48 provided in the ASIC 42. The stream I/F 48 applies the received MPEG 4 stream to the SDRAM controller 56 by a predetermined amount through the bus B3, and writes it to the MPEG area 54c (see FIG. 5) of the SDRAM 54.

The CPU 44 repeatedly issues a reading request to the SDRAM controller 56 in order to read the MPEG 4 stream stored in the MPEG area 54c by a predetermined amount. The MPEG 4 stream read by the SDRAM controller 56 is applied to a card I/F 58 through a bus B4, and recorded in a memory card 64 by the card I/F 58. The MPEG 4 stream is stored in an MPEG file formed in the memory card 64. When a moving image recording end operation is performed, the MPEG 4 codec 26 and the stream I/F 36 are stopped by the CPU 44 to thereby end the moving image recording process.

When a still image recording operation is performed during the moving image recording process or after completion of the moving image recording process, the CPU 44 activates the CCD output circuit 38, a signal processing circuit 50 and a JPEG codec 60. The CCD output circuit 38 issues a reading request to the SDRAM controller 30 in order to read one frame of the raw image data by a predetermined amount from the raw image area 32a (see FIG. 4) of the SDRAM 32. The raw image data read by the SDRAM controller 30 is applied to the CCD output circuit 38 by the bus B1. The CCD output circuit 38 outputs the one frame of the raw image data thus applied to the signal processing circuit 50 provided in the ASIC 42.

The signal processing circuit 50 performs processing such as a color separation, a YUV conversion, etc. on the raw image data applied from the CCD output circuit 38 to generate YUV image data having a horizontal resolution 1280 pixels× a vertical resolution of 960 pixels and having an aspect ratio of 4:3 as shown in FIG. 8 (C). The created YUV image data is applied to the SDRAM controller 56 through the bus B3, and then written to a still image area 54d (see FIG. 5) of the SDRAM 54. The JPEG codec 60 repeatedly issues a reading request to the SDRAM controller 56 in order to read the YUV image data stored in the still image area 54d by a predetermined amount. The YUV image data is read by the SDRAM controller 56, and applied to the JPEG codec 60 through the bus B3. The JPEG codec 60 performs JPEG compression on the applied YUV image data, and repeatedly requests the SDRAM controller 56 to write the compressed image data, that is, the JPEG data. The SDRAM controller 56 writes the JPEG data applied from the JPEG codec 60 through the bus B3 to a JPEG area 54a of the SDRAM 54.

The CPU 44 reads the one frame of the JPEG data thus retained in the JPEG area 54a by a predetermined amount through the bus B4 and the SDRAM controller 56, and records the read JPEG data in the memory card 64 through the bus B4 and the card I/F 58. Consequently, a JPEG file is created in the memory card 64.

When a reproduction mode is selected by the key input device 68 to select a desired MPEG file in the memory card 64, the CPU 44 accesses the memory card 64 through the bus B4 and the card I/F 58, and reproduces an MPEG 4 stream from the desired MPEG file. The reproduced MPEG 4 stream is applied to the SDRAM controller 56 through the bus B4 by a predetermined amount, and written to the MPEG area 54c (see FIG. 5) of the SDRAM 54 by the SDRAM controller 56.

The stream I/F 48 repeatedly issues a reading request to the SDRAM controller 56, and reads the MPEG 4 stream stored in the MPEG area 54c by a predetermined amount. The read MPEG 4 stream is applied to the stream I/F 48 through the bus B3, and then output to the stream I/F 36.

The stream I/F 36 repeatedly requests the SDRAM controller 30 to write the applied MPEG 4 stream. The SDRAM controller 30 writes the MPEG 4 stream applied from the stream I/F 36 through the bus B1 to the MPEG area 32c (see FIG. 4) of the SDRAM 32.

The MPEG 4 codec 26 reads the MPEG 4 stream stored in the MPEG area 32c by a predetermined amount through the SDRAM controller 30. The read MPEG 4 stream is applied to the MPEG 4 codec 26 through the bus B1, and expanded in an MPEG 4 system. The expanded YUV image data is output at a rate of one frame per 1/30 seconds from the MPEG 4 codec 26, and applied to the SDRAM controller 30 by a predetermined amount through the bus B1. The YUV image data is then written to the moving image area 32b (see FIG. 4) of the SDRAM 32.

The D1-I/F 40 reads the YUV image data from the moving image area 32b through the SDRAM controller 30, and performs format converting processing as described above on the YUV image data input through the bus B1. The resolution of the YUV image data is reduced from a horizontal resolution 1280 pixels× a vertical resolution of 720 pixels to a horizontal resolution 720 pixels× a vertical resolution of 480 pixels, and a letter box component is assigned to the both vertical ends of the reduced YUV image data. The YUV image data is also created at a rate of one frame per 1/30 seconds, and the created YUV image data is output to the D1-I/F 52.

As described above, the data transfer from the SDRAM 32 to the D1-I/F 40 is executed at a clock rate of 54 MHz, and the data transfer from the D1-I/F 40 to the D1-I/F 52 is executed at a clock rate of 27 MHz.

The D1-I/F 52 applies each frame of the YUV image data applied from the D1-I/F 40 to the SDRAM controller 56 by a predetermined amount through the bus B3. The YUV image data is written to the moving image area 54b (see FIG. 5) of the SDRAM 54 by the SDRAM controller 56.

The NTSC encoder 62 reads the YUV image data stored in the moving image area 54b through the SDRAM controller 56 by a predetermined amount, and converts the YUV image data applied through the bus B3 into a composite video signal in the NTSC system. The reading processing and the converting processing are executed at a rate of one frame per 1/30 seconds. The converted composite video signal is output to the LCD monitor 66 to thereby display a reproduced motion image on the monitor screen as shown in FIG. 6 (B).

When the D4-I/F 28 is connected to the HDTV, the D4-I/F 28 is activated in place of the D1-I/F 40 or along with the D1-I/F 40. The D4-I/F 28 reads the YUV image data from the moving image area 32b (see FIG. 4) of the SDRAM 32 through the SDRAM controller 30. The YUV image data of each frame is read in a raster scanning manner (progressive scanning manner) every 1/30 seconds, and applied to the D4-I/F 28 through the bus B1.

The D4-I/F 28 converts the applied YUV image data into a video signal being compliant with a D4 standard, and outputs the converted video signal to the HDTV. Consequently, a reproduced motion image of high image quality is displayed on the TV screen as shown in FIG. 6 (A).

When a desired JPEG file is selected in a state that a reproduction mode is selected, the CPU 44 accesses the memory card 64 through the bus B4 and the card I/F 58 and reproduces the JPEG data stored in the desired JPEG file. The reproduced JPEG data is written to the JPEG area 54a (see FIG. 5) of the SDRAM 54 through the bus B4 and the SDRAM controller 56.

The JPEG codec 60 reads the JPEG data stored in the JPEG area 54a by a predetermined amount through the SDRAM controller 56, and expands the JPEG data applied through the bus B3. The JPEG codec 60 further requests the SDRAM controller 56 to write the expanded YUV image data. The SDRAM controller 56 writes the YUV image data transferred through the bus B3 to the still image area 54d (see FIG. 5) of the SDRAM 54.

The NTSC encoder 62 reads the YUV image data stored in the still image area 54d through the bus B3 and the SDRAM controller 56, and converts the read YUV image data into a composite video signal in the NTSC system. At this time, the resolution is reduced from a horizontal resolution 1280 pixels× a vertical resolution of 960 pixels to a horizontal resolution 720 pixels× a vertical resolution of 480 pixels. The reading processing and converting processing are executed at a rate of one frame per 1/30 seconds as described above. The converted composite video signal is output to the LCD monitor 66 to thereby display a reproduced still image on the monitor screen.

When the D4-I/F 28 is connected to the HDTV, an XBUS-I/F 46 is activated in place of the NTSC encoder 62. The XBUS-I/F 46 reads the YUV image data from the still image area 54d through the bus B4 and the SDRAM controller 56, and outputs the read YUV image data to the XBUS-I/F 34 provided in the ASIC 20. The XBUS-I/F 34 writes the applied YUV image data to the still image area 32d (see FIG. 4) of the SDRAM 32 by a predetermined amount through the bus B2 and the SDRAM controller 30.

The D4-I/F 28 reads the YUV image data by a predetermined amount from the still image area 32d through the bus B1 and the SDRAM controller 30, and converts the read YUV image data to a video signal in the D4 standard. The reading processing and the converting processing are executed at a rate of one frame per 1/30 seconds. The converted video signal is output to the HDTV, and a still image of high image quality is displayed on the TV screen.

The resolution of the YUV image data read from the still image area 32d is a horizontal resolution 1280 pixels× a vertical resolution of 960 pixels while the resolution of the video signal output to the HDTV is a horizontal resolution 1280 pixels× a vertical resolution of 720 pixels. Thus, a still image with the both vertical ends partially omitted is displayed on the TV screen.

As understood from the above description, raw image data (first moving image data) output from each of the CDS/AGC/AD circuits 18a and 18b is fetched by the channel matching circuit 22 (fetching means), and written to the SDRAM 32 (first memory) through the bus B1 (first bus). The raw image data stored in the first memory is read through the bus B1, and is subjected to processes such as a color separation and a YUV conversion (first processing) by the signal processing circuit 24 (first processing means). The YUV image data (second moving image data) created by the signal processing circuit 24 is written to the SDRAM 32 through the bus B1. The YUV image data stored in the SDRAM 32 is read through the bus B1, and subjected to output processing directed for the HDTV (first monitor) by the D4-I/F 28 (first output means). Consequently, a corresponding moving image is displayed on the screen of the HDTV.

The D1-I/F 40 (reducing means) reduces the resolution of the YUV image data read from the SDRAM 32 through the bus B1. The low-resolution YUV image data (third moving image data) is written to the SDRAM 54 (second memory) through the bus B3 (second bus). The YUV image data stored in the SDRAM 54 is read through the bus B3, and is subjected to output processing directed to the LCD monitor (second monitor) by the NTSC encoder 62 (second output means). Consequently, a corresponding moving image is displayed on the screen of the second monitor.

Thus, a series of processes for creating YUV image data for HDTV is executed by means of the bus B1 and the SDRAM 32. Furthermore, a series of processes for creating YUV image data for the LCD monitor 66 is executed by means of the bus B3 and the SDRAM 54. Here, the resolution of the YUV image data for HDTV is higher than that of the YUV image data for LCD monitor. That is, the bus B1 and the SDRAM 32 are utilized for the high speed processing like processing for a high-resolution moving image data, and the bus B3 and the SDRAM 54 are utilized for the low speed processing like processing for low-resolution moving image data. Thus, the processes conforming to the plurality of formats can be executed without causing failure.

Furthermore, when a moving image recording operation is performed, the YUV image data read from the SDRAM 32 through the bus B1 is compressed by the MPEG codec 26 (first compressing means). The MPEG 4 stream (fourth moving image data) thus created is written to the SDRAM 32 through the bus B1. Both of the YUV image data before the compression and the MPEG 4 stream after the compression are transmitted through the common bus B1, so that it is possible to realize high-speed compression processing.

The MPEG 4 stream is then read from the SDRAM 32 through the bus B1, and written to the SDRAM 54 through the bus B3. The MPEG 4 stream is then read from the SDRAM 54 through the bus B3, and recorded in the memory card 64 (recording medium) by the card I/F 58 (moving image recording means).

When a still image recording operation is performed, one frame of raw image data (first still image data) is extracted by the CCD output circuit 38 (second processing means) so as to be converted into the YUV image data (second still image data). The converted YUV image data is written to the SDRAM 54 through the bus B3, and recorded in the memory card 58 through JPEG compression. By utilizing the bus B2 and the SDRAM 54 in the still image data processing (low speed processing) being free from the problem of a frame rate, it is possible to avoid failure of the processing.

Additionally, the CCD imager is used as an image sensor in this embodiment, but other image sensors like a CMOS imager, etc. may be adopted in place of this. Furthermore, in this embodiment, the JPEG system is adopted as a compression system of the still image, but the JPEG2000 system may be adopted in place of this. In addition, in this embodiment, the MPEG 4 system is adopted in a compression system of the moving image, but other moving image compression systems like the MJPEG system, the MJPEG2000 system, or the H.264 system may be adopted in place of this.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a fetcher which fetches first moving image data to be written to a first memory through a first bus;
   a first processor which performs first processing on the first moving image data read from said first memory through the said first bus to generate second moving image data to be written to said first memory through said first bus;
   a first outputter which performs output processing directed to a first monitor on second moving image data read from said first memory through said first bus;
   a reducer which reduces a resolution of the second moving image data read from said first memory through said first bus to generate third moving image data to be written to a second memory through a second bus; and
   a second outputter which performs output processing directed to a second monitor on the third moving image data read from said second memory through said second bus.

2. An image processing apparatus according to claim 1, wherein said first moving image data is data including pixels each of which is assigned any one of a plurality of colors, and said first processing includes color processing for assigning all the plurality of colors to each of the pixels.

3. An image processing apparatus according to claim 1, wherein said second moving image data has a first resolution corresponding to a first aspect ratio, and said third moving image data has a second resolution corresponding to a second aspect ratio.

4. An image processing apparatus according to claim 3, wherein said first aspect ratio is 16:9, and said second aspect ratio is 4:3.

5. An image processing apparatus according to claim 1, wherein said second moving image data and said third moving image data has the same frame rate with each other.

6. An image processing apparatus according to claim 1, wherein said fetcher includes an imager which periodically images an object scene.

7. An image processing apparatus according to claim 6, wherein said imager has an imaging surface formed with a plurality of partial imaging areas and a plurality of output channels respectively assigned to said plurality of partial imaging areas, and said fetcher further includes a creator which creates said first moving image data on the basis of electric charges output from said plurality of output channels.

8. An image processing apparatus according to claim 1, further comprising a first compressor which compresses a data amount of the second moving image data read from said first memory through said first bus to generate fourth moving image data to be written to said first memory through said first bus.

9. An image processing apparatus according to claim 8, wherein said first compressor executes the compression processing when a first predetermined operation is performed.

10. An image processing apparatus according to claim 8, further comprising: a first writer which writes the fourth moving image data read from said first memory through said first bus to said second memory through said second bus; and a moving image recorder which records the fourth moving image data read from said second memory to a recording medium through said second bus.

11. An image processing apparatus according to claim 1, further comprising a second processor which processes second processing on one frame of first still image data forming said first moving image data to generate second still image data to be written to said second memory through said second bus.

12. An image processing apparatus according to claim 11, wherein said second processor executes said second processing when a second predetermined operation is performed.

13. An image processing apparatus according to claim 11, further comprising a second compressor which compresses a data amount of the second still image data read from said second memory through said second bus to generate third still image data to be written to said second memory through said second bus.

14. An image processing apparatus according to claim 13, further comprising a still image recorder which records the third still image data created by said second compressor on a recording medium.

* * * * *